3,284,431
PRODUCTION OF CIS-1,4 POLYBUTADIENE WITH A HIGHER FATTY ACID SALT OF COBALT-DI-HYDROCARBON ALUMINUM HALIDE-ALUMINUM CATALYST
Morris Gippin, Akron, Ohio, assignor to The Firestone Tire & Rubber Company, Akron, Ohio, a corporation of Ohio
No Drawing. Filed Mar. 18, 1963, Ser. No. 266,059
2 Claims. (Cl. 260—94.3)

This invention relates to a process for the polymerization of butadiene to yield rubbery polymers having structural units largely of the cis-1,4 configuration, and to catalytic compositions useful in said process.

Butadiene, being the simplest and most available of the conjugated dienes, has served as the basis of an extensive technology for the preparation of polymers designed to serve the functions of Hevea rubber. The polymers of butadiene heretofore produced, while they have served as practical substitutes for Hevea rubber in many applications, nevertheless fail to match natural Hevea rubber in many properties, notably in internal friction and resilience properties. It appears that these deficiencies result from the irregular configurations in which the butadiene units enter the polymers heretofore prepared therefrom, and that greatly superior products would result if greater proportions of the butadiene units entered the polymeric chain in what is known as the cis-1,4 configuration, i.e., in the form of units having the formula:

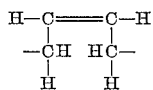

The resultant configuration, since it is homologous to the structure of Hevea rubber, should on theoretical grounds, and in point of fact does, exhibit properties superior to those of the random butadiene polymers heretofore produced.

It has been proposed in Belgian Patent 575,671, based on the U.S. application of Tucker, Serial No. 714,966, filed February 13, 1958, now U.S. 3,094,514, and in Italian Patents 588,825, 592,477 and 594,618, to polymerize butadiene in the presence of catalysts prepared from organometallic compounds and cobalt salts under anhydrous conditions. Whatever may be true of other portions of the field of catalytic compositions postulated by these patents, the present applicant has found that in at least one area, specifically where dihydrocarbon aluminum monohalide compounds are used as the reducing components of the catalysts, the general instructions of the patent are inoperative to bring about polymerization of butadiene. Specifically, the present applicant has discovered that in this area, contrary to the instructions in the cited patents that pure reagents must be used, certain definite amounts of extraneous reagents, hereinafter designated "activating agents" must be present, as otherwise the polymerization reaction will not take place.

Accordingly, it is an object of this invention to provide a means for polymerization of butadiene to yield polymers of superior properties.

A further object is to provide such polymers having superior internal friction and resilience properties in comparison with conventional butadiene polymers.

A further object is to provide a novel catalytic process for the polymerization of butadiene to yield polymers in which the polymeric butadiene units occur largely in the cis-1,4 configuration above referred to.

Another object is to make use of cobalt-containing catalysts in connection with dihydrocarbon aluminum monohalides in the polymerization of butadiene.

A still further object is to provide novel catalysts for carrying out the process of this invention.

A still further object is to provide a novel method for the preparation of such catalysts.

SYNOPSIS OF THE INVENTION

The above and other objects are secured, in accordance with this invention, by polymerizing butadiene in contact with a catalyst comprising a dihydrocarbon aluminum halide, a cobalt salt, and certain "activating agents," within the following compositional limits:

(1) The dihydrocarbon aluminum halide to be present to the extent of from 1 to 100 millimols per 100 grams of butadiene in the polymerization mass.

(2) The cobalt salt to be present to the extent of from 1.0 to 20 or more millimols per 100 grams of butadiene in the polymerization mass when the cobalt salt is a simple salt substantially insoluble in hydrocarbon solvents, or from .005 to 1.0 or more millimols per 100 grams of butadiene in the polymerization mass when the cobalt salt is at least partially soluble as will be described hereinbelow.

(3) The activating agent, which is taken from the following types of materials:

| Organic peroxides | Halogens |
| Alcohols | Metallic aluminum |
| Halohydrins | Halohydrocarbons | to be present to the extent of .01 to 3.0 mols (gram-atoms in the case of bromine or metallic aluminum) per mol of the dihydrocarbon aluminum halide.

Under these conditions, polymerization takes place smoothly and rapidly, with the formation of polymers of butadiene containing the butadiene residues largely in the desired cis-1,4 configuration—over 90% in all cases, over 95% in most cases, and in the preferred area of very low levels of cobalt salt, in the range of .006 to 0.05 millimol per 100 grams of butadiene (using hydrocarbon-soluble cobalt salts) as high as 96–98%.

THE DIHYDROCARBON ALUMINUM HALIDES

Compounds of this type suitable for use in this invention are those having the formula (1) 

wherein
R, independently in each occurrence, represents a hydrocarbon radical containing from 1 to 40, preferably 1 to 10, carbon atoms, and
X is a halogen.

Radicals which may be represented by R in Formula 1 are exemplified in the straight, branched chain and cyclic aliphatic hydrocarbon radicals, such as methyl, ethyl, propyl, isopropyl, butyl, isobutyl, t-butyl, pentyl, hexyl, octyl, 2-ethyl hexyl, the mixed alkyls derived from petroleum fractions or by the reduction of fatty acid residues contained in natural fats, dodecyl, hexadecyl, eicosyl, cyclohexyl, 3-methyl cyclohexyl and the like; and aryl, alkaryl and aralkyl radicals such as phenyl, o-, m- and p-tolyl, the various xylyls, tt-octyl phenyl, alphanaphthyl, beta-naphthyl and the like. The halogen represented by X in formula 1 may be fluorine, chlorine, bromine, or iodine, preferably one of the last three. Specific suitable compounds include dimethyl aluminum chloride, diethyl aluminum chloride, diisobutyl aluminum chloride, di-n-hexyl aluminum chloride, diethyl aluminum bromide, diisobutyl aluminum iodide, di(2-ethyl) hexyl chloride, diphenyl aluminum iodide, di-alpha-napthyl aluminum chloride, and the like. It will be understood that, instead of a single pure dihydrocarbon aluminum halide, there may be employed a mixture of one or more such compounds.

THE COBALT COMPOUND

This may be any of the various cobalt salts, either di- or trivalent (preferably the former), such as the insoluble or very slightly soluble chloride, iodide, bromide, sulfate, phosphate, phosphite, nitrate and the like. Particularly suitable for use in this invention are cobalt compounds which are somewhat soluble (say to the extent of about 0.06 or more millimols per 100 ml. of hydrocarbon solvent such as benzene) in the hydrocarbon reaction medium, such as the hydrocarbon-solvent-soluble complexes of inorganic salts of cobalt with nitrogenous compounds such as pyridine, aniline, ethylamine, phenylhydrazine, dimethylformamide, morpholine, acetamide and the like. Still more soluble compounds such as cobalt acetylacetonate, higher fatty acid salts of cobalt on the order of cobaltous oleate, cobaltous stearate, cobaltous 2-ethyl-hexanoate (commonly termed "octoate" or "octanoate"), cobaltous acetylacetonate and the like. Such soluble cobalt compounds and complexes may be used in very small amounts with greatly superior results.

THE ACTIVATING AGENTS

As noted above, these may be any of the types of activating agents listed above in the section entitled "Synopsis of the Invention." Specific exemplary substances are organic peroxides and hydroperoxides containing say 2 to 20 carbon atoms such as acetyl peroxide, t-butyl peroxide, lauroyl peroxide, cumene hydroperoxide, dicumyl peroxide, benzoyl peroxide, and the like, alcohols containing say 1–30 carbon atoms such as methanol, ethanol, n-propanol, isopropanol, n-butanol, t-butanol, 2-ethyl-hexanol, dodecanol, the mixed alcohols produced by reduction of the fatty acids of natural fats such as coconut oil, tallow and the like, oxo process alcohols, etc., chlorohydrins such as ethylene chlorohydrin, 1-chloro-2,3-dihydroxy propane, and the like, elemental bromine, elemental chlorine, elemental aluminum (preferably in finely divided form), and halohydrocarbons such as methyl chloride, ethylene dichloride, t-butylchloride, sec-butylchloride, allyl chloride, chlorinated petroleum fractions, and the like. Instead of the individual substances set forth above, it will be understood that mixtures of two or more such substances may be used. It was noted above that the activating agents should be supplied to the extent of 0.01 to 3.0 mols per mol of dihydrocarbon aluminum compound. In calculating mols of mixtures of activating agents, mols of the mixtures will be considered equal to the sum of the mols of the individual substances contained in the mixtures and indicated as being suitable in this invention.

THE PREPARATION OF THE CATALYSTS AND THE PROPORTIONING OF THE INGREDIENTS THEREOF

The dihydrocarbon aluminum halide, cobalt salt and activating agent entering into the catalytic compositions of this invention may be combined with each other and with the butadiene in substantially any order. The catalyst may suitably be prepared by mixing the dialkyl aluminum halide and activating agent in either order into a body of a suitable inert solvent of the type discussed hereinbelow, followed by the cobalt salt; or the dialkyl aluminum halide and cobalt salt may be mixed first and the activating agent added subsequently. The butadiene may be present during the preparation of the catalyst, or the catalyst may be prepared in the absence of the butadiene and added thereto when it is desired to effect polymerization. As to the proportion of ingredients, if the mol ratio of activating agent to dihydrocarbon aluminum halide is less than about 0.01, no polymerization will take place at all. Above this figure, polymerization takes place readily, rising to a maximum and thereafter declining when the ratio is above about 3.0. Adjustment of this ratio between these limits provides a means for controlling the molecular weight, and also the gel content, of the polymer produced; increasing the content of the activating agent increases both the molecular weight and gel content. With regard to the dihydrocarbon aluminum halide and cobalt compound, the determining factor here appears to be the absolute mol concentrations of these components with respect to the butadiene. The polymerization reaction mass must contain, per 100 grams of butadiene, at least 1.0 millimol of dihydrocarbon aluminum halide, as otherwise no polymerization will take place. A maximum of 100 millimols of dihydrocarbon aluminum halide is imposed by a deterioration in the properties of the polybutadiene produced. Preferred limits are 5–50 millimols of dialkyl aluminum chloride per 100 grams of butadiene. With regard to the cobalt compound, there are two ranges. If the cobalt compound is not soluble in hydrocarbons, the minimum should be about 1 millimol of cobalt compound per 100 grams of butadiene and the maximum should be about 20 millimols of cobalt compound. The preferred range for insoluble cobalt compounds is 5–15 millimols per 100 grams of butadiene. If hydrocarbon-soluble cobalt compounds are used, the range should be 0.005 to 1.0 millimol of cobalt compound per 100 grams of butadiene. It is greatly preferred to operate with hydrocarbon-soluble cobalt compounds, and with very low levels of these compounds, say on the order of .006–.05 millimol of cobalt compound per 100 grams of butadiene, as the resultant polymers have the highest values of cis-1,4 unsaturation, on the order of 95% or better. Suitable inert solvents for the conduct of these operations include, for instance, saturated aliphatic or aromatic hydrocarbon vehicles such as petroleum ether, heptane, kerosene, mineral oil, diesel oil, benzene, toluene, the various xylenes, and the like.

THE POLYMERIZATION PROCEDURE AND PROPERTIES OF THE POLYMERS

The polymerization is carried out by contacting butadiene with the catalyst, at temperatures in the range —40° C. to 150° C., although higher or lower temperatures may be used. A preferred range is —5° C. to +10° C. Usually, there will be present an inert solvent, which may be, for instance, any of the cyclic or paraffinic hydrocarbons suggested above for the preparation of the catalyst. The reaction medium should be as far as possible free from polar compounds, other than the small amounts of activating agents noted above as being essential in carrying out the reaction, which would react with and destroy the catalyst. Preferably, but not necessarily, sufficient pressure is applied to maintain the butadiene in the liquid phase. Likewise, the polymerization process should be agitated to assist diffusion of the monomer to the polymerization site and, where insoluble catalyst components are used, to keep the catalyst particles dispersed throughout the polymerization mass, as least until the viscosity has increased to such a degree that the catalyst will no longer settle out. When the polymerization has proceeded to the desired degree, the polymerized butadiene is recovered in any suitable way; for instance, if the reaction has been carried out in a hydrocarbon solvent, the resultant solution can be mixed with methyl ethyl ketone, methanol, isopropanol or other non-solvent for the polymer, which will precipitate in the form of a coagulum which can be milled, calendered, extruded, etc. upon conventional rubber machinery. The polymer may also be recovered by evaporating the solvent, for instance by injection into hot water, or passing through a heated extruder, drum drier apparatus or the like.

The butadiene polymers produced in accordance with this invention will be found to have the butadiene units polymerized therein to a large extent, say 90% or better, and in the optimum cases 95% or better, in the cis-1,4 configuration. This improved chemical configuration is reflected in the greatly improved rubbery properties of the polymers, the vulcanizates of which have much reduced internal friction, and much better resilience and tensile strength as compared to polybutadienes heretofore prepared.

The proportions of cis-1,4-, trans-1,4- and 1,2-configurations reported hereinafter were determined by infrared analysis by measurement of the transmission of film samples at wavelengths for the several structures, and using extinction coefficients, as follows:

TABLE I

| Structure | Cis-1,4- | Trans-1,4 | 1,2- |
| --- | --- | --- | --- |
| Wavelength ($\mu$) | 7.6 | 10.36 | 11.0 |
| Extinction coefficient | 7.6 | 110 | 140 |

The amounts of cis-1,4-, trans-1,4- and 1,2-additions are determined with the above extinction coefficients using base-line optical densities at each of the three wavelengths as described in Belgian Patent 575,671 and Italian Patents 588,825 and 592,477 cited above. The polymers may be vulcanized by substantially the same sulfur, sulfur and accelerator, peroxide and other systems by which conventional butadiene-based rubbers are vulcanized, to yield products which are useful in pneumatic tires (particularly as the tread and body stocks thereof), resilient rubber mountings, torsion springs and the like.

With the foregoing general discussion in mind, there are given herewith detailed examples of the practice of this invention. All parts given are by weight.

*Example*

| | |
| --- | --- |
| Benzene | Q.s. for a total weight of 900 grams of benzene.[1] |
| Butadiene | 100 grams. |
| Diethyl aluminum chloride solution (1.84 molar, in benzene) | 20 mmol.[2] |
| Activating agent (nature per Table I, usually in benzene solution or dispersion) | 0–18 mmol. (per Table I). |
| Cobalt octoate solution 0.0195 molar, in benzene | 2.05 ml. (0.04 mmol.). |

[1] Including the benzene introduced by the solutions of the other reagents.
[2] The abbreviation "mmol." is used in this specification to denote "millimols."

A series of polymerization runs was made in polymerization bottles, details of the procedure being as set forth below. Details of the several runs are set forth in Table I.

A. *Purification of reagents.*—Butadiene (99 mol of purity, Phillips Petroleum Company) was distilled through a column and condensed at a solid $CO_2$-acetone mixture cooled condenser head. A 100-gram forerun was discarded before collecting the distillate.

Thiophene-free benzene was distilled through a closed, nitrogen-purged apparatus under a slight positive nitrogen pressure. The first 10% by volume was discarded. The subsequent distillate was then passed through a 14″ x 2″ column of activated silica gel, the first liter of the percolate being discarded. The following percolate was used in polymerization runs.

Lamp-grade nitrogen is used throughout these and subsequent operations.

Activator reagents which required drying were kept over calcium hydride for 24 hours and filtered under cover of nitrogen.

B. *Polymerization.*—The calculated amount of butadiene was distilled directly into a previously dried and oven-baked 28-ounce bottle containing the required amount of purified benzene to which about 50 grams of calcium hydride had been added. The bottle was then sealed with a crown cap provided with a butadiene-acrylonitrile rubber liner and allowed to stand overnight. The bottle containing the solution of butadiene in benzene was then vented and opened, and while purging with nitrogen, a glass-wool plug was packed into the neck of the bottle. The bottle was capped again and pressured with nitrogen. By means of double-needle valve (⅛″ bar stock stainless steel needle valve to which a ⅛″ brass close nipple was silver-soldered at each end, a hypodermic syringe lock-tip being silver-soldered to each nipple). The butadiene solution in benzene was transferred away from the calcium hydride into another dried, oven-baked bottle under cover of nitrogen. The bottle containing the filtered butadiene solution in benzene was capped and placed in a 5° C. polymerization box where it was allowed to rotate for about 2 hours in order to ensure thorough pre-chilling to 5° C.

The catalyst components were then injected, i.e., the solution of diethyl aluminum chloride, followed by the activator solution and then by the cobalt octanoate solution. The bottle was then replaced in rotating position in the 5° C. polymerizer for 20 hours, or less. The bottle was then cut open and the contents placed in isopropanol containing some phenyl-beta-naphthylamine in which it was allowed to remain until the next day. Additional stabilizer of any suitable type was added in the usual manner, and the polymer dried in a 50° C. vacuum oven. Following are particulars of the several runs:

TABLE II

| Activator Agent Used | | Mmol. Supplied | Yield of Polymer (Percent) | Infra Red Analysis of Polymer | | | Dilute Solution Viscosity | Run No. |
|---|---|---|---|---|---|---|---|---|
| Chemical Name | Form in Which Used | | | Cis-1,4 | Trans-1,4 | 1,2 | | |
| Bromine | 0.1 Molar (Br), in benzene. | 0.0 | 0 | -- | -- | -- | -- | 1 |
| | | 2.0 | 5.0 | -- | -- | -- | -- | 2 |
| | | 4.0 | 97.2 | 95 | 3 | 3 | 3.0 | 3 |
| | | 6.0 | 97.5 | 95 | 3 | 2 | 1.8 | 4 |
| | | 8.0 | 100.0 | 95 | 3 | 2 | 1.1 | 5 |
| Cumene Hydroperoxide | 1.0 Molar, in benzene. | 0.0 | 0.0 | -- | -- | -- | -- | 6 |
| | | 1.0 | 0.0 | -- | -- | -- | -- | 7 |
| | | 2.0 | 91.6 | 97 | 2 | 2 | 3.4 | 8 |
| | | 4.0 | 99.7 | 98 | 1 | 2 | 4.9 | 9 |
| | | 6.0 | 91.4 | 98 | 1 | 1 | 6.2 | 10 |
| | | 8.0 | 17.0 | 98 | 1 | 1 | 6.1 | 11 |
| t-Butanol | ----do---- | 0.0 | 0.0 | -- | -- | -- | -- | 12 |
| | | 4.0 | 100 | 94 | 3 | 3 | 2.1 | 13 |
| | | 6.0 | 99.6 | 93 | 4 | 4 | 1.6 | 14 |
| | | 8.0 | 94.6 | 92 | 4 | 4 | 1.4 | 15 |
| | | 10.0 | 96.9 | 94 | 4 | 3 | 2.0 | 16 |
| | | 18.0 | 2.9 | 98 | -- | -- | 5.0 | 17 |
| Metallic Aluminum | Granular, 30-mesh. | 0.0 | 0.0 | -- | -- | -- | -- | 18 |
| | | 1.7 | 53.3 | -- | -- | -- | -- | 19 |
| Allyl Chloride | 1.0 Molar in benzene. | 0.0 | 0.0 | -- | -- | -- | -- | 20 |
| | | 2.0 | 66.0 | 98 | 1 | 1 | 3.8 | 21 |
| | | 4.0 | 85.2 | 98 | 1 | 1 | 3.5 | 22 |
| | | 8.0 | 71.6 | 98 | 1 | 1 | 2.5 | 23 |
| Ethylene Chlorohydrin | ----do---- | 0.0 | 0.0 | -- | -- | -- | -- | 24 |
| | | 1.0 | 0.0 | -- | -- | -- | -- | 25 |
| | | 2.0 | 98.7 | 96 | 2 | 3 | 2.5 | 26 |
| | | 4.0 | 100.0 | 93 | 3 | 4 | 1.6 | 27 |
| | | 6.0 | 98.6 | 94 | 3 | 4 | 1.9 | 28 |
| | | 8.0 | 100.0 | 95 | 3 | 3 | 2.8 | 29 |
| | | 10.0 | 99.3 | 94 | 3 | 3 | 2.2 | 30 |
| t-Butyl Chloride | ----do---- | 0 | 0 | -- | -- | -- | -- | 31 |
| | | 2 | 88.4 | 98 | 2 | 1 | 3.6 | 32 |
| | | 4 | 81.8 | 98 | 1 | 1 | 3.1 | 33 |
| | | 8 | 79.9 | 95 | 3 | 2 | 1.3 | 34 |
| Isobutyl Chloride | ----do---- | 0 | 0 | -- | -- | -- | -- | 35 |
| | | 2 | 88.4 | 95 | 2 | 3 | 1.8 | 36 |
| | | 4 | 85.5 | 95 | 3 | 3 | 1.9 | 37 |
| | | 8 | 91.1 | 96 | 2 | 2 | 3.0 | 38 |
| sec-Butyl Chloride | 1.0 Molar. | 0 | -- | -- | -- | -- | -- | 39 |
| | | 2 | 90.5 | -- | -- | -- | -- | 40 |
| | | 4 | 78.2 | -- | -- | -- | -- | 41 |
| | | 8 | 69.7 | -- | -- | -- | -- | 42 |

What is claimed is:

1. Process of polymerizing butadiene to form polymers high in cis-1,4-structure, which comprises contacting the same with a catalyst consisting of the reaction product of (1) a dihydrocarbon aluminum halide in which the hydrocarbon groups each contain from 1 to 30 carbon atoms, (2) a higher fatty acid salt of cobalt and (3) an activating agent consisting of metallic aluminum, the dihydrocarbon aluminum halide being supplied to the extent of from 1 to 100 millimols per 100 grams of butadiene, the higher fatty acid salt of cobalt being supplied to the extent of from .005 to 1.0 millimol per 100 grams of butadiene, and the activating agent being supplied in a ratio of 0.01 to 3.0 millimols of activating agent per millimol of dihydrocarbon aluminum halide.

2. Process according to claim 1 wherein the fatty acid salt of cobalt is cobalt octanoate.

References Cited by the Examiner

UNITED STATES PATENTS

| 3,072,630 | 1/1963 | De Jong | 260—94.9 |
| 3,101,327 | 8/1963 | Lyons | 260—94.9 |
| 3,111,510 | 11/1963 | Balas | 260—94.3 |
| 3,157,627 | 11/1964 | Friedlander | 260—94.3 |
| 3,161,628 | 12/1964 | Dost et al. | 260—94.9 |

FOREIGN PATENTS

| 213,051 | 1/1961 | Austria. |
| 790,399 | 2/1958 | Great Britain. |

OTHER REFERENCES

Gippin: ACS Preprints, vol. 6, No. 4, September 1961, pages A–25 to A–42.

JOSEPH L. SCHOFER, *Primary Examiner.*

E. J. SMITH, *Assistant Examiner.*